United States Patent [19]

Ward

[11] Patent Number: 4,488,254
[45] Date of Patent: Dec. 11, 1984

[54] METHOD AND APPARATUS FOR EFFICIENT DATA STORAGE

[75] Inventor: Stephen W. Ward, Dayton, Ohio

[73] Assignee: NCR Corporation, Dayton, Ohio

[21] Appl. No.: 134,257

[22] Filed: Mar. 26, 1980

[51] Int. Cl.³ .................. G06F 3/00; G06F 3/14
[52] U.S. Cl. .................................. 364/900
[58] Field of Search ... 364/200 MS File, 900 MS File

[56] References Cited

U.S. PATENT DOCUMENTS

| | | | |
|---|---|---|---|
| 3,654,611 | 4/1972 | Bluethman et al. | 364/200 |
| 3,735,363 | 5/1973 | Beers et al. | 364/200 |
| 3,805,250 | 4/1974 | Rich | 364/200 |
| 4,042,912 | 8/1977 | Bachman et al. | 364/200 |
| 4,079,449 | 3/1978 | Mercurio et al. | 364/900 |
| 4,202,041 | 5/1980 | Kaplow et al. | 364/900 |

Primary Examiner—Gareth D. Shaw
Assistant Examiner—John G. Mills
Attorney, Agent, or Firm—J. T. Cavender; Albert L. Sessler, Jr.

[57] ABSTRACT

A method and apparatus for displaying frames of information on a CRT screen which reduces the memory requirements of the system by representing the words used in the message frames and the horizontal and vertical relationships between the words as single symbols. The repertoire of words used to construct the messages is stored only once, along with the symbols, significantly reducing the memory requirements of the system.

4 Claims, 25 Drawing Figures

| OFFSET MOD 4 | MASK VALUE | BIT VALUE |
|---|---|---|
| 0 | C0H | 11000000 |
| 1 | 30H | 00110000 |
| 2 | 0CH | 00001100 |
| 3 | 03H | 00000011 |

FIG. 5A

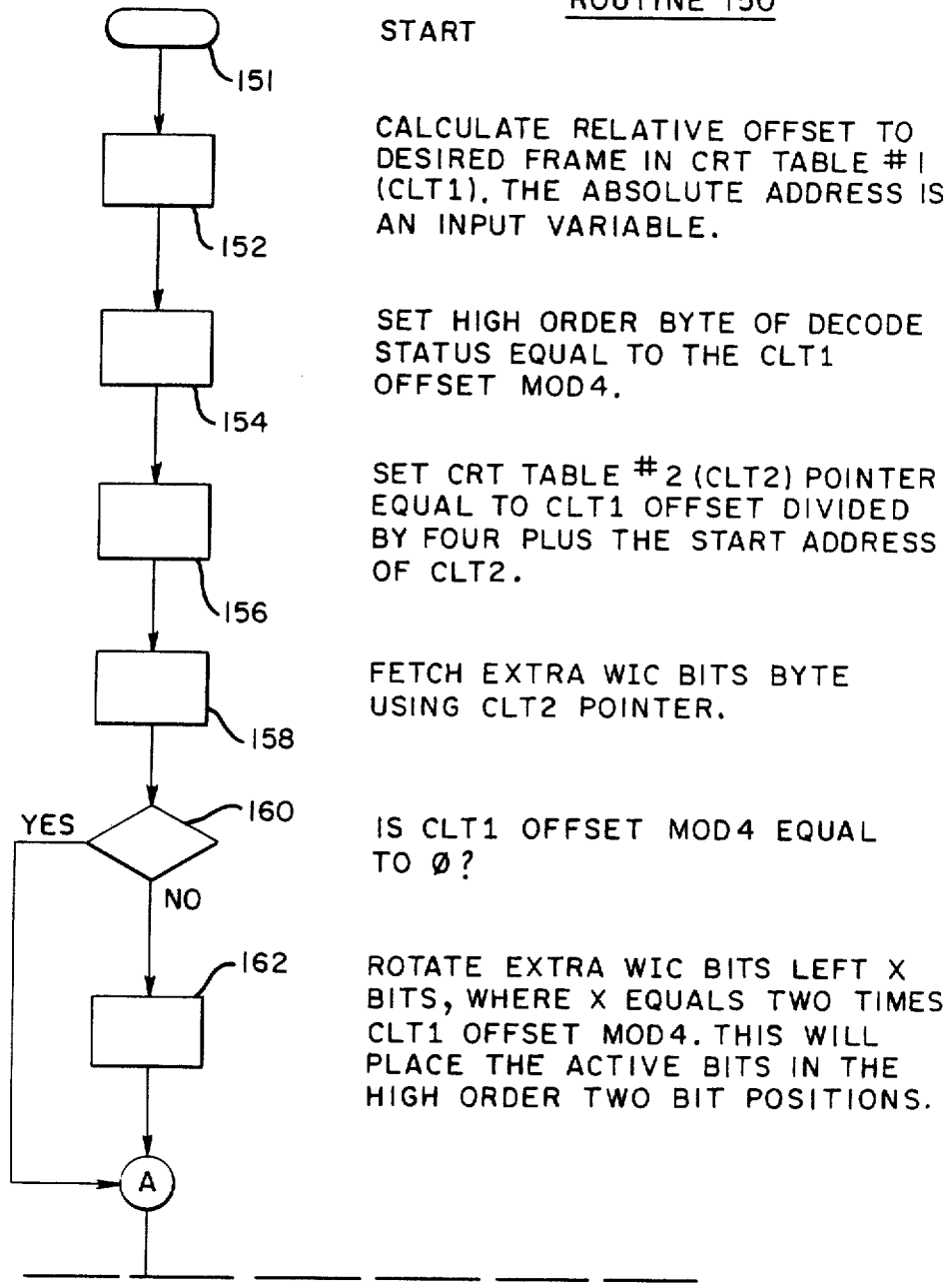

CALCULATE POINTER
TO CRT TABLE #2
ROUTINE 150

START

CALCULATE RELATIVE OFFSET TO DESIRED FRAME IN CRT TABLE #1 (CLT1). THE ABSOLUTE ADDRESS IS AN INPUT VARIABLE.

SET HIGH ORDER BYTE OF DECODE STATUS EQUAL TO THE CLT1 OFFSET MOD 4.

SET CRT TABLE #2 (CLT2) POINTER EQUAL TO CLT1 OFFSET DIVIDED BY FOUR PLUS THE START ADDRESS OF CLT2.

FETCH EXTRA WIC BITS BYTE USING CLT2 POINTER.

IS CLT1 OFFSET MOD 4 EQUAL TO 0?

ROTATE EXTRA WIC BITS LEFT X BITS, WHERE X EQUALS TWO TIMES CLT1 OFFSET MOD 4. THIS WILL PLACE THE ACTIVE BITS IN THE HIGH ORDER TWO BIT POSITIONS.

FIG. 6A

DECODE A CRT LINE
ROUTINE 180

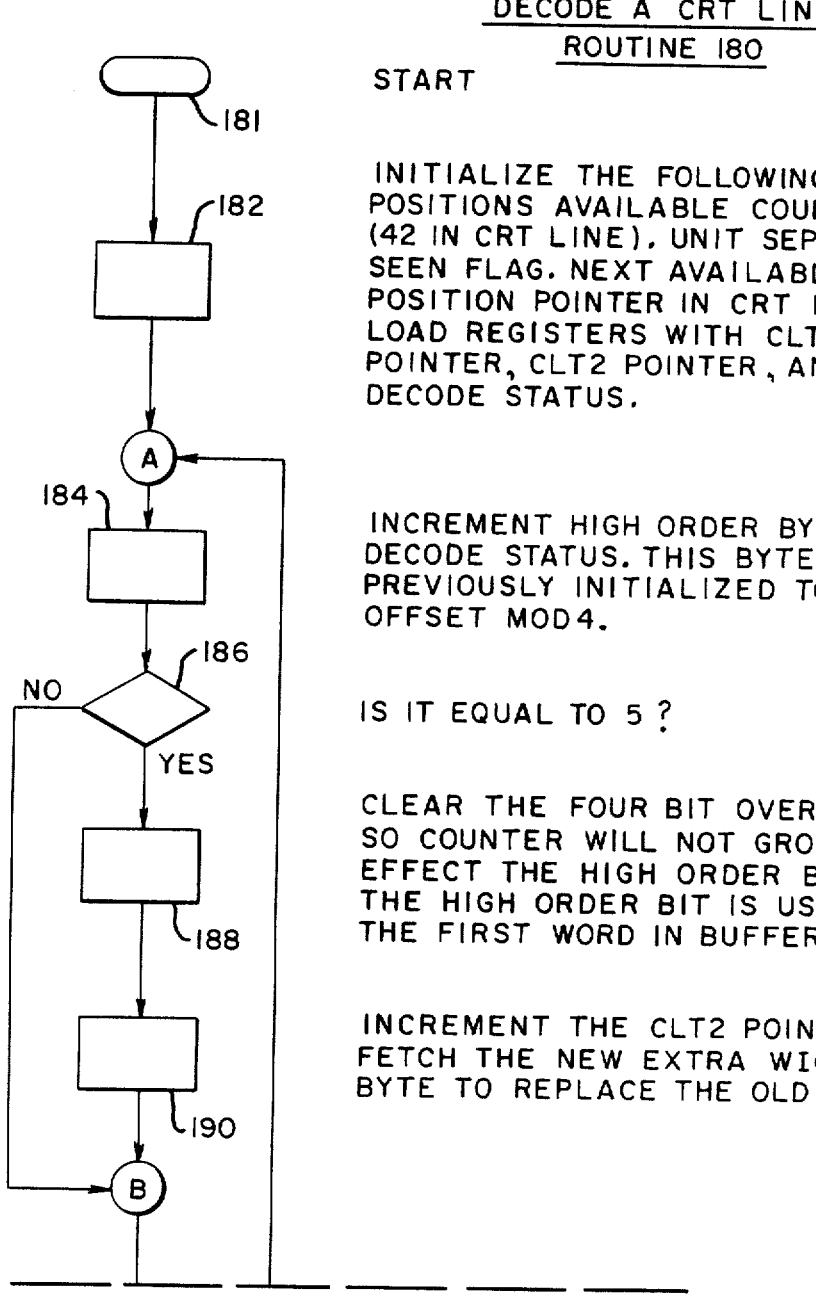

START

INITIALIZE THE FOLLOWING ITEMS: POSITIONS AVAILABLE COUNTER (42 IN CRT LINE), UNIT SEPARATOR SEEN FLAG, NEXT AVAILABLE POSITION POINTER IN CRT LINE. LOAD REGISTERS WITH CLT1 POINTER, CLT2 POINTER, AND DECODE STATUS.

INCREMENT HIGH ORDER BYTE OF DECODE STATUS. THIS BYTE WAS PREVIOUSLY INITIALIZED TO CLT1 OFFSET MOD 4.

IS IT EQUAL TO 5?

CLEAR THE FOUR BIT OVERFLOW, SO COUNTER WILL NOT GROW AND EFFECT THE HIGH ORDER BITS. THE HIGH ORDER BIT IS USED AS THE FIRST WORD IN BUFFER FLAG.

INCREMENT THE CLT2 POINTER, FETCH THE NEW EXTRA WIC BITS BYTE TO REPLACE THE OLD BYTE.

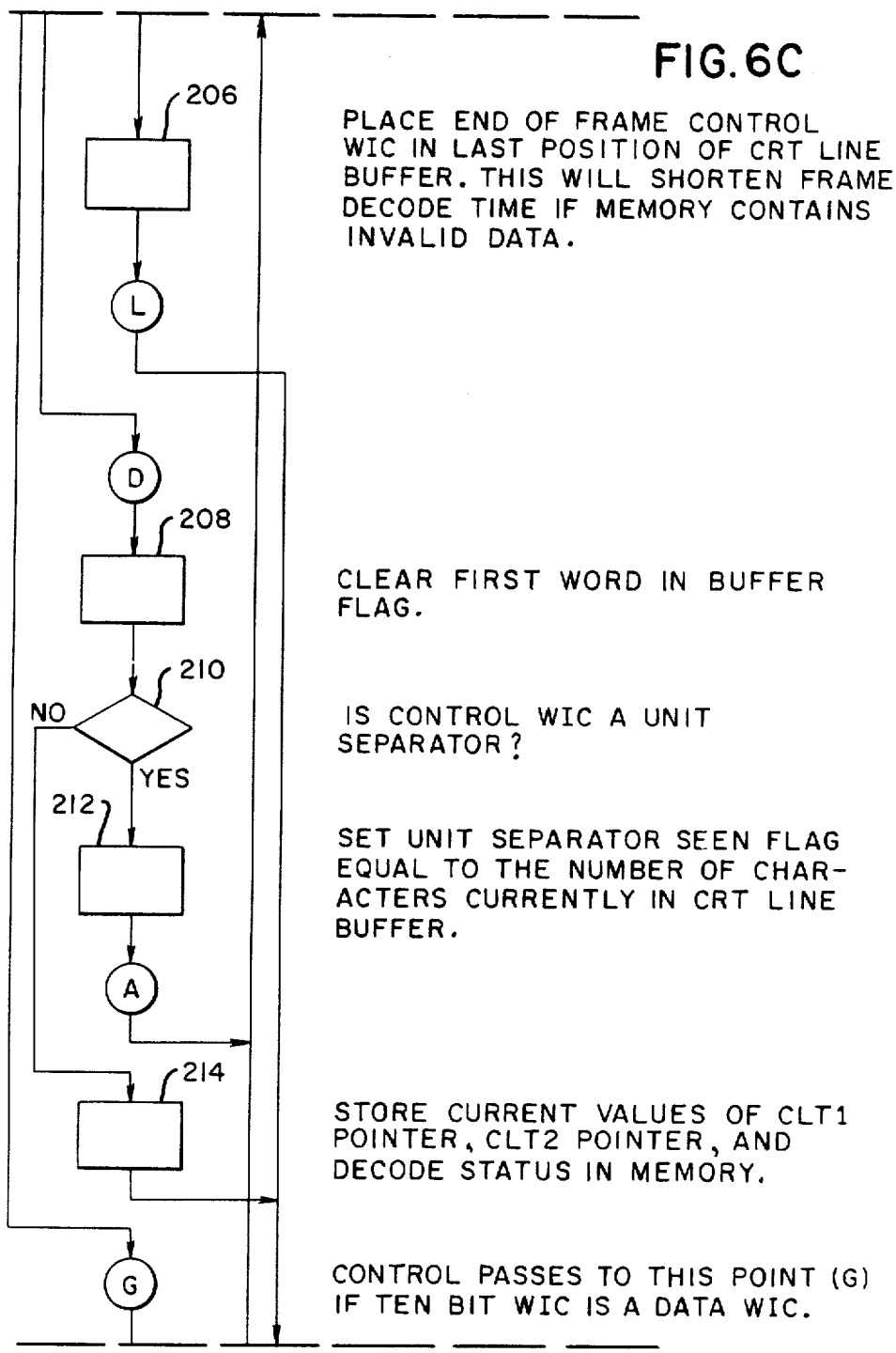

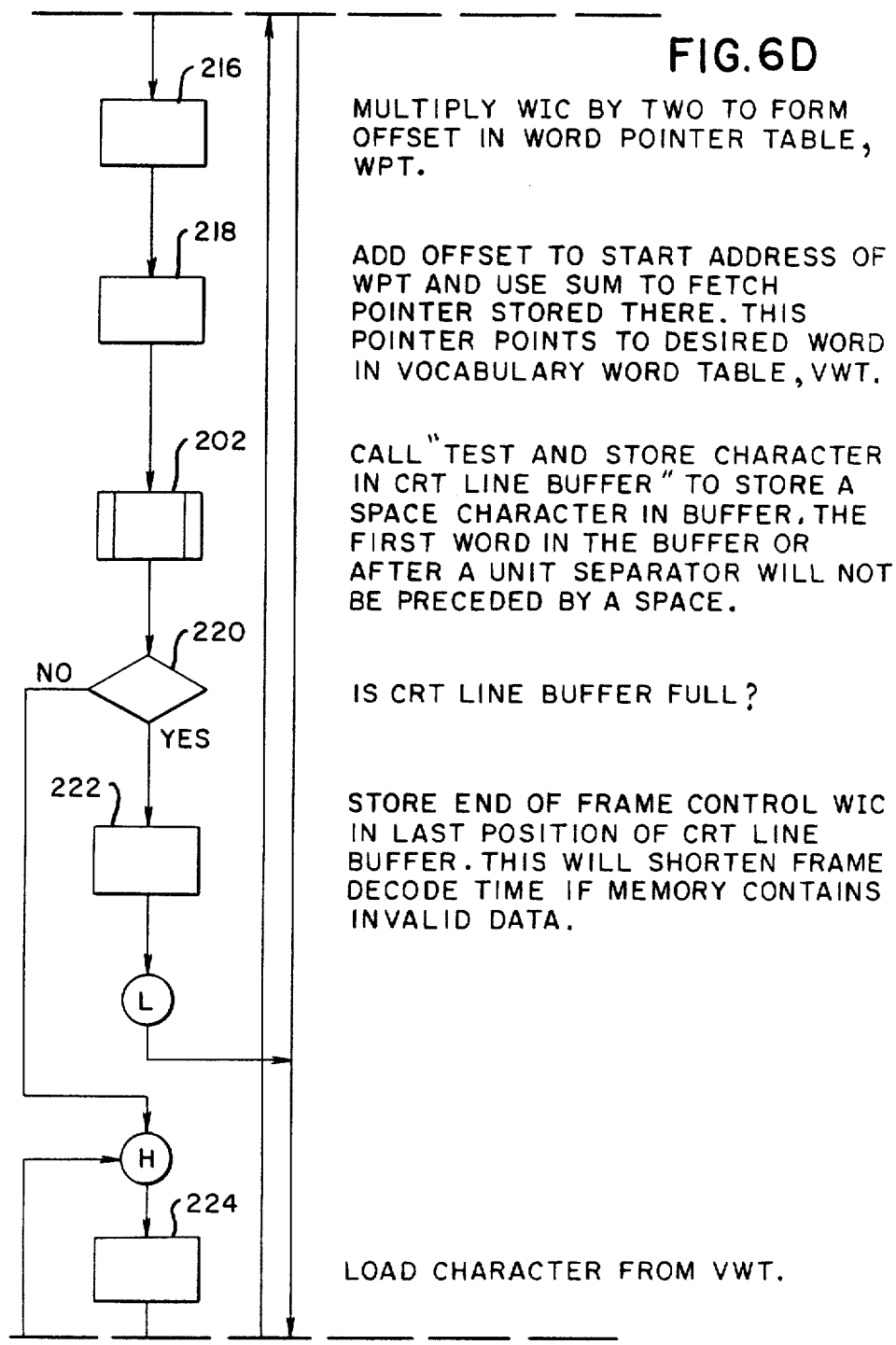

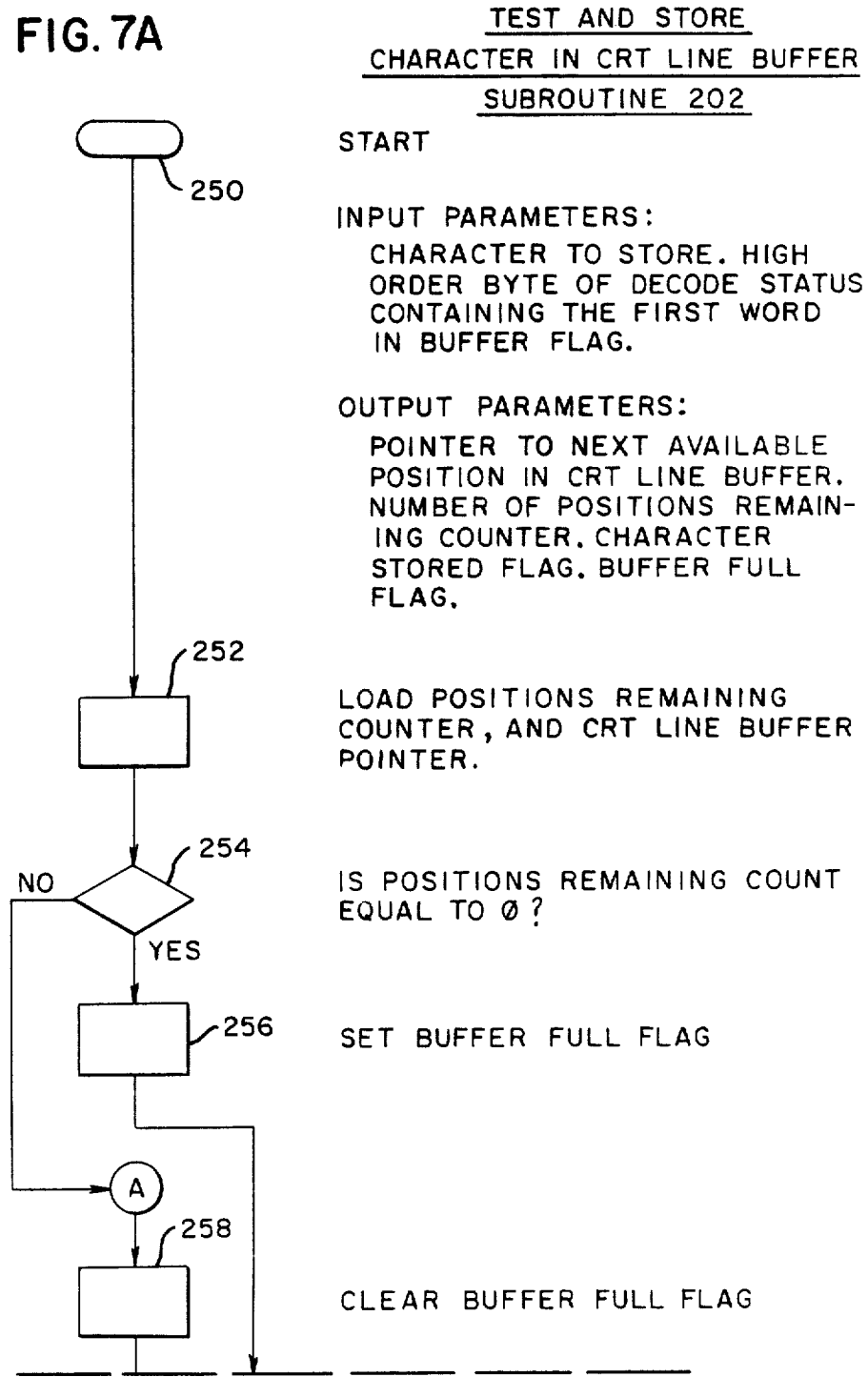

FIG. 7A

TEST AND STORE
CHARACTER IN CRT LINE BUFFER
SUBROUTINE 202

START

INPUT PARAMETERS:
CHARACTER TO STORE. HIGH ORDER BYTE OF DECODE STATUS CONTAINING THE FIRST WORD IN BUFFER FLAG.

OUTPUT PARAMETERS:
POINTER TO NEXT AVAILABLE POSITION IN CRT LINE BUFFER. NUMBER OF POSITIONS REMAINING COUNTER. CHARACTER STORED FLAG. BUFFER FULL FLAG.

LOAD POSITIONS REMAINING COUNTER, AND CRT LINE BUFFER POINTER.

IS POSITIONS REMAINING COUNT EQUAL TO 0 ?

SET BUFFER FULL FLAG

CLEAR BUFFER FULL FLAG

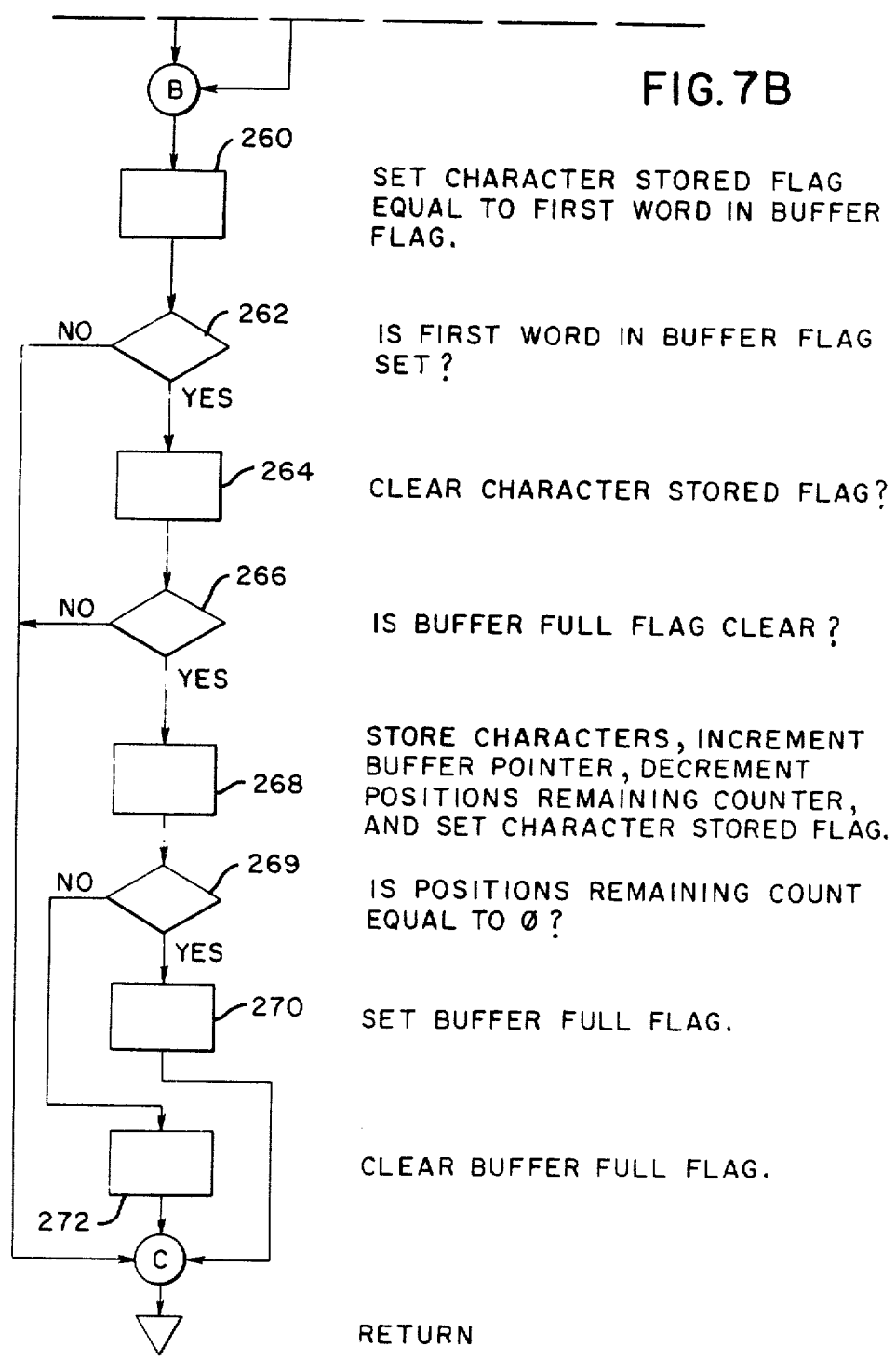

FIG. 8A

CALCULATE POINTER TO CRT TABLE #2 ROUTINE

;ON ENTRY:  HL = CRT(CLT) ADDRESS
;ON RETURN: NO REGS SAVED   DECODE STATUS, #2 POINTER,
            AND EXTRA WIC BYTE INITIALIZED
;STACK USE: 0 BYTES
TRRRC2:

| MEMORY LOCATION | MACHINE EXECUTABLE INSTRUCTIONS | SYMBOLIC LABELS | OPERATIONAL CODES | OPERANDS | DESCRIPTION |
|---|---|---|---|---|---|
| 057A | EB |  | XCHG |  | ;DE = CURRENT CLT ADDR |
| 057B | 2AC420 |  | LHLD | TRTDC1 | ;HL = CLT START ADDR |
| 057E | 7B |  | MOV | A,E | ;DOUBLE SUBTRACT |
| 057F | 95 |  | SUB | L | START FROM CURRENT ADDR |
| 0580 | 6F |  | MOV | L,A |  |
| 0581 | 7A |  | MOV | A,D |  |
| 0582 | 9C |  | SBB | H |  |
| 0583 | 67 |  | MOV | H,A | ;HL = CLT CURRENT OFFSET |
| 0584 | 7D |  | MOV | A,L |  |
| 0585 | E603 |  | ANI | 03H | ;OFFSET MOD 4 |
| 0587 | 326712 |  | STA | TRWDST+1 | ;INITIALIZE STATUS (HO BYTE) |
| 058A | 47 |  | MOV | B,A |  |
| 058B | 0E02 |  | MVI | C,2 |  |
| 058D | B7 | TRRR10: | ORA | A | ;DIVIDE 16 BIT CLT OFFSET BY 4, IT WILL BE |
| 058E | 7C |  | MOV | A,H | ;USED AS AN OFFSET IN CRT TABLE #2 |
| 058F | 1F |  | RAR |  |  |

FIG. 8B

| MEMORY LOCATION | MACHINE EXECUTABLE INSTRUCTIONS | SYMBOLIC LABELS | OPERATIONAL CODES | OPERANDS | DESCRIPTION |
|---|---|---|---|---|---|
| 0590 | 67 | | MOV | H,A | |
| 0591 | 7D | | MOV | A,L | |
| 0592 | 1F | | RAR | | |
| 0593 | 6F | | MOV | L,A | |
| 0594 | 0D | | DCR | C | |
| 0595 | C28D05 | | JNZ | TRRR10 | ;LOOP ONCE FOR EACH DIVIDE BY 2 |
| 0598 | EB | | XCHG | | |
| 0599 | 2A3820 | | LHLD | TRTDC2 | ;ADDRESS OF CRT TABLE #2 |
| 059C | 19 | | DAD | D | ;ADD OFFSET |
| 059D | 7E | | MOV | A,M | ;A = EXTRA WIC BITS 9 & 10 |
| 059E | 05 | | DCR | B | ;IF B = 0, WE DO NOT NEED TO ROTATE |
| 059F | 04 | | INR | B | ;THE EXTRA WIC BITS BYTE |
| 05A0 | CAA905 | | JZ | TRRR12 | ;JMP IF B = 0 |
| 05A3 | 07 | TRRR11: | RLC | | ;B OLD WIC NEW WIC |
| 05A4 | 07 | | RLC | | ;0    C0H      C0H |
| 05A5 | 05 | | DCR | B | ;1    30H      C0H |
| 05A6 | C2A305 | | JNZ | TRRR11 | ;2    0CH      C0H |
| | | | | | ;3    03H      C0H |
| 05A9 | 326612 | TRRR12: | STA | TRWDST | ;STORE EXTRA WIC BITS BYTE |
| 05AC | 226412 | | SHLD | TRWDC2 | ;CRT TABLE #2 POINTER |
| 05AF | 7C | | MOV | A,H | |
| 05B0 | DE20 | | SBI | TRTDNO SHR 8 | |
| 05B2 | FE70 | | CPI | (TRFWNW*8) | |

FIG. 8C

| MEMORY LOCATION | MACHINE EXECUTABLE INSTRUCTIONS | SYMBOLIC LABELS | OPERATIONAL CODES | OPERANDS | DESCRIPTION |
|---|---|---|---|---|---|
| 05B4 | D8 | | RC | | ;RET, IF CLT2 IS IN LEGAL RANGE |
| 05B5 | 217900 | | LXI | H,TRRDFC | ;ADDRESS OF EF WIC |
| 05B8 | 226212 | | SHLD | TRWDCP | ;NEW CLT1 |
| 05BB | 210000 | | LXI | H,0 | |
| 05BE | 226612 | | SHLD | TRWDST | ;NEW DECODE STATUS FOR CONTROL WIC |
| 05C1 | C9 | | RET | | |

FIG. 9A

DECODE CRT LINE ROUTINE

;ON ENTRY: -
;ON RETURN: NO REGS SAVED
;STACK USE: 8 BYTES
TRRRCR:

| MEMORY LOCATION | MACHINE EXECUTABLE INSTRUCTIONS | SYMBOLIC LABELS | OPERATIONAL CODES | OPERANDS | DESCRIPTION |
|---|---|---|---|---|---|
| 05C2 | 217012 | | LXI | H,TRWDBR | ;INIT CRT LINE BUFFER |
| 05C5 | 362A | | MVI | M,TRCRBL | ;POSITIONS AVAILABLE IN BUFFER |
| 05C7 | 23 | | INX | H | |
| 05C8 | 36FF | | MVI | M,OFFH | ;SET BUFFER FLAG = FF. NO US SEEN |
| 05CA | 23 | | INX | H | |
| 05CB | 226812 | | SHLD | TRWDBP | ;CRT LINE BUFFER START ADDRESS |
| 05CE | 2A6612 | | LHLD | TRWDST | ;DECODE STATUS |
| 05D1 | 44 | | MOV | B,H | ;EXTRA WIC BITS |
| 05D2 | 4D | | MOV | C,L | |

FIG.9B

| MEMORY LOCATION | MACHINE EXECUTABLE INSTRUCTIONS | SYMBOLIC LABELS | OPERATIONAL CODES | OPERANDS | DESCRIPTION |
|---|---|---|---|---|---|
| 05D3 | 2A6212 | | LHLD | TRWDCP | ;DE = CLT POINTER |
| 05D6 | EB | | XCHG | | ;HL = CLT2 POINTER |
| 05D7 | 2A6412 | | LHLD | TRWDC2 | |
| 05DA | 78 | TRRR20: | MOV | A,B | ;DECODE STATUS IN B |
| 05DB | 04 | | INR | B | ;INC EXTRA WIC BITS COUNT |
| 05DC | E604 | | ANI | 04H | ;TEST CURRENT COUNT = 4 |
| 05DE | CAE705 | | JZ | TRRR21 | ;JMP IF COUNT NOT REACHED 4 |
| 05E1 | 78 | | MOV | A,B | |
| 05E2 | E6FB | | ANI | 0FBH | ;CLEAR 04H BIT |
| 05E4 | 47 | | MOV | B,A | |
| 05E5 | 23 | | INX | H | |
| 05E6 | 4E | | MOV | C,M | ;FETCH NEW CLT2 BYTE |
| 05E7 | E5 | TRRR21: | PUSH | H | ;CLT2 POINTER |
| 05E8 | 79 | | MOV | A,C | |
| 05E9 | 07 | | RLC | | |
| 05EA | 07 | | RLC | | |
| 05EB | 4F | | MOV | C,A | |
| 05EC | E603 | | ANI | 03H | ;UPDATE EXTRA WIC BITS |
| 05EE | 67 | | MOV | H,A | ;BITS 9&10 OF WIC |
| 05EF | 1A | | LDAX | D | ;BITS 1-8 OF WIC |
| 05F0 | 13 | | INX | D | |
| 05F1 | D5 | | PUSH | D | ;CLT POINTER |
| 05F2 | C5 | | PUSH | B | ;DECODE STATUS |
| 05F3 | C22906 | | JNZ | TRRR23 | ;JMP, IF DATA WIC |

FIG. 9C

| MEMORY LOCATION | MACHINE EXECUTABLE INSTRUCTIONS | SYMBOLIC LABELS | OPERATIONAL CODES | OPERANDS | DESCRIPTION |
|---|---|---|---|---|---|
| 05F6 | FE04 | | CPI | TRCREF+1 | ;TEST FOR CONTROL WIC |
| 05F8 | D22906 | | JNC | TRRR23 | ;JMP, IF DATA WIC |
| | | ;PROCESS CONTROL WIC | | | |
| 05FB | 0680 | | MVI | B,80H | ;STORE CONTROL WIC IN BUFFER |
| 05FD | CD6206 | | CALL | TRRR29 | |
| 0600 | D25B06 | | JNC | TRRR26 | ;JMP IF BUFFER OVER FLOW TO CANCEL THE FRAME |
| 0603 | 51 | | MOV | D,C | ;SAVE CONTROL WIC |
| 0604 | 3E2A | | MVI | A,TRCRBL | ;CALCULATE # OF CHARS CURRENTLY IN BUFFER |
| 0606 | 90 | | SUB | B | |
| 0607 | 5F | | MOV | E,A | ;DECODE STATUS |
| 0608 | C1 | | POP | B | |
| 0609 | 78 | | MOV | A,B | |
| 060A | E67F | | ANI | 7FH | |
| 060C | 47 | | MOV | B,A | |
| 060D | 7A | | MOV | A,D | ;CLEAR FIRST WORD IN BUFFER FLAG |
| 060E | FE00 | | CPI | TRCRUS | |
| 0610 | 7B | | MOV | A,E | ;CONTROL WIC |
| 0611 | D1 | | POP | D | ;CLT POINTER |
| 0612 | E1 | | POP | H | ;CLT2 POINTER |
| 0613 | C21C06 | | JNZ | TRRR22 | ;JMP IF WIC NOT US. END OF LINE |
| 0616 | 327112 | | STA | TRWDBF | ;STORE CURRENT LENGTH OF MSG INCLUDING US |
| 0619 | C3DA05 | | JMP | TRRR20 | ;CONTINUE WITH THE LINE |
| | | TRRR22: | | | |
| 061C | 226412 | | SHLD | TRWDC2 | ;UPDATE CLT2 POINTER |

FIG. 9D

| MEMORY LOCATION | MACHINE EXECUTABLE INSTRUCTIONS | SYMBOLIC LABELS | OPERATIONAL CODES | OPERANDS | DESCRIPTION |
|---|---|---|---|---|---|
| | | ;PROCESS DATA WIC | | | |
| 061F | EB | | XCHG | | |
| 0620 | 226212 | | SHLD | TRWDCP | ;UPDATE CLT POINTER |
| 0623 | 60 | | MOV | H,B | |
| 0624 | 69 | | MOV | L,C | |
| 0625 | 226612 | | SHLD | TRWDST | ;UPDATE DECODE STATUS |
| 0628 | C9 | | RET | | |
| | | TRRR23: | | | ;NON-CNTRL WIC ENTRY POINT |
| 0629 | 6F | | MOV | L,A | ;HL = 10 BIT WIC |
| 062A | 29 | | DAD | H | ;*2 TO GET OFFSET IN WPT |
| 062B | EB | | XCHG | | |
| 062C | 2A3620 | | LHLD | TRTDWP | ;HL = ADDR OF WPT |
| 062F | 19 | | DAD | D | ;HL = ADDR OF POINTER TO DESIRED WORD |
| 0630 | 5E | | MOV | E,M | ;DE = START ADDR OF WORD IN VWT |
| 0631 | 23 | | INX | H | |
| 0632 | 56 | | MOV | D,M | |
| 0633 | 3E20 | | MVI | A,20H | ;ASCII SPACE CHAR |
| 0635 | CD6206 | | CALL | TRRR29 | ;STORE SPACE IF PROPE |
| 0638 | CA5B06 | | JZ | TRRR26 | ;JMP IF BUFFER FULL TO CANCEL THE FRAME |
| 063B | 1A | TRRR24: | LDAX | D | ;CHAR FROM VWT |
| 063C | E67F | | ANI | 7FH | ;CLEAR END OF WORD FLAG |
| 063E | 77 | | MOV | M,A | ;STORE IN BUFFER |
| 063F | 1A | | LDAX | D | ;CHAR FROM VWT |
| 0640 | 23 | | INX | H | |
| 0641 | 13 | | INX | D | |

FIG. 9E

| MEMORY LOCATION | MACHINE EXECUTABLE INSTRUCTIONS | SYMBOLIC LABELS | OPERATIONAL CODES | OPERANDS | DESCRIPTION |
|---|---|---|---|---|---|
| 0642 | 2F | | CMA | | ;A=7F, IF LAST CHAR |
| 0643 | F67F | | ORI | 7FH | ;A=FF, IF NOT LAST CHAR |
| 0645 | 05 | | DCR | B | ;COUNT OF SPACE REMAINING |
| 0646 | 80 | | ADD | B | |
| 0647 | DA3B06 | | JC | TRRR24 | ;JMP ONLY IF A=FF AND B NOT ZERO |
| 064A | 78 | | MOV | A,B | ;UPDATE BUFFER SPACE REMAINS COUNT |
| 064B | 327012 | | STA | TRWDBR | |
| 064E | 226812 | | SHLD | TRWDBP | ;UPDATE BUFFER POINTER |
| 0651 | C1 | TRRR25: | POP | B | ;DECODE STATUS |
| 0652 | 78 | | MOV | A,B | |
| 0653 | F680 | | ORI | 80H | |
| 0655 | 47 | | MOV | B,A | ;SET FIRST WORD (AT LEAST) IN BUFFER FLAG |
| 0656 | D1 | | POP | D | ;CLT POINTER |
| 0657 | E1 | | POP | H | ;CLT2 POINTER |
| 0658 | C3DA05 | | JMP | TRRR20 | ;LOOP UNTIL END OF LINE WIC FOUND |
| 065B | 2B | TRRR26: | DCX | H | ;FORCE END OF FRAME |
| 065C | 3603 | | MVI | M,TRCREF | ;IF BUFFER OVERFLOWS |
| 065E | C1 | | POP | B | ;THIS WILL SHORTEN BRING-UP |
| 065F | D1 | | POP | D | ;TIME IF WAROM CONTENT INVALID |
| 0660 | E1 | | POP | H | |
| 0661 | C9 | | RET | | |

FIG. IOA

| MEMORY LOCATION | MACHINE EXECUTABLE INSTRUCTIONS | SYMBOLIC LABELS | OPERATIONAL CODES | OPERANDS | DESCRIPTION |
|---|---|---|---|---|---|
| | | | TEST BUFFER AND STORE CHAR IN CRT LINE BUFFER ROUTINE | | |
| | | ;ON ENTRY: | A = CHAR TO STORE | | |
| | | | B = DECODE STATUS. STORE ONLY IF BIT 801 IS SET | | |
| | | ;ON RETURN: | HL = ADDR NEXT AVAILABLE BUFFER POSITION | | |
| | | | B = NUMBER OF REMAINING BYTES | | |
| | | | C = ORIGINAL CHAR TO STORED | | |
| | | | CARRY SET = CHAR WAS STORED | | |
| | | | CARRY CLEAR = CHAR WAS NOT STORED | | |
| | | | ZERO SET = BUFFER FULL | | |
| | | | ZERO CLEAR = SOME SPACE IN BUFFER REMAINS | | |
| | | ;STACK USE: | DE = SAVED | | |
| | | | 0 BYTES | | |
| | | TRRR29: | | | |
| 0662 | 4F | | MOV | C,A | ;C = CHAR TO STORE |
| 0663 | 217012 | | LXI | H,TRWDBR | ;BYTES REMAINING COUNT |
| 0666 | 7E | | MOV | A,M | ;ZERO SET IF NO SPACE REMAINS |
| 0667 | B7 | | ORA | A | |
| 0668 | 78 | | MOV | A,B | ;DECODE STATUS |
| 0669 | 46 | | MOV | B,M | ;B = COUNT OF REMAINING BUFFER SPACE |
| 066A | 2A6812 | | LHLD | TRWDBP | ;HL = BUFFER POINTER |
| 066D | 07 | | RLC | | |
| 066E | D0 | | RNC | | ;RET IF NO STORE INDICATED |
| 066F | 78 | | MOV | A,B | |
| 0670 | B7 | | ORA | A | ;CARRY CLEAR. NO CHAR STORED |

FIG.10B

| MEMORY LOCATION | MACHINE EXECUTABLE INSTRUCTIONS | SYMBOLIC LABELS | OPERATIONAL CODES | OPERANDS | DESCRIPTION |
|---|---|---|---|---|---|
| 0671 | C8 | | RZ | | ;RET IF NO SPACE REMAINS |
| 0672 | 71 | | MOV | M,C | ;STORE THE CHAR |
| 0673 | 23 | | INX | H | |
| 0674 | 226812 | | SHLD | TRWDBP | ;UPDATE BUFFER POINTER |
| 0677 | 3D | | DCR | A | |
| 0678 | 327012 | | STA | TRWDBR | ;UPDATE BUFFER REMAINDER COUNT |
| 067B | 47 | | MOV | B,A | ;B = REMAINDER ;ZERO SET, IF NO SPACE REMAINS |
| 067C | 37 | | STC | | ;CARRY SET. CHAR STORED |
| 067D | C9 | | RET | | |

METHOD AND APPARATUS FOR EFFICIENT DATA STORAGE

BACKGROUND OF THE INVENTION

This invention relates generally to a method and apparatus for displaying information on a read-out device and, in particular, to a method and apparatus for storing alphanumeric characters for display on a cathode ray tube (CRT) screen.

In certain user-type machines, such as automated financial teller terminals, it is frequently necessary to provide an associated display device on which "lead-through" instructions are displayed to instruct the user as to how to operate the terminal. Certain messages are displayed on the CRT screen to instruct the user as to what action should be taken to process a particular financial transaction.

A typical automated financial teller terminal generally has a microprocessor included therein to perform many of the routine functions associated with the terminal; however, this terminal and several others are usually coupled to and controlled by a host controller via transmission lines. In the past, some of the messages to be displayed on the CRT screen of the terminal were sent from the host controller, requiring both an extensive amount of memory in the host controller and also long transmission time in sending the data forming the messages to the display screen.

SUMMARY OF THE INVENTION

It is therefore an object of the present invention to provide a novel method and apparatus for displaying alphanumeric characters on a display device that significantly reduces the memory requirements of the system. It is also an object of the present invention to reduce the transmission time necessary to display the alphanumeric characters on the display device. It is a further object of the present invention to reduce the cost of producing a user-type machine such as an automated financial teller terminal.

These and other objects are accomplished in the present instance by using a novel method of storing the alphanumeric messages to be displayed on the CRT screen which reduces the representations of the horizontal and vertical relationships between the words on the multiline display, and also the representations of words themselves, to single symbols. The repertoire of words used in the construction of the lead-through messages is stored in the memory only once. Only the symbols which represent the words and their relationships are stored for each message, significantly reducing the memory requirements of the system.

BRIEF DESCRIPTION OF THE DRAWINGS

FIGS. 5A and 5B, taken together, represent a flowchart showing the "Calculate Pointer to CRT Table No. 2" routine;

FIGS. 6A–6F inclusive, taken together, represent a flowchart showing the "Decode the CRT Line" routine;

FIGS. 7A and 7B, taken together, represent a flowchart showing the "Test and Store Character in CRT Line Buffer" routine;

FIGS. 8A–8C inclusive, taken together, show a detailed program listing of the "Calculate Pointer to CRT Table No. 2" routine shown in FIGS. 5A and 5B;

FIGS. 9A–9E inclusive, taken together, show a detailed program listing of the "Decode a CRT Line" routine shown in FIGS. 6A–6F;

FIGS. 10A and 10B, taken together, show a detailed program listing of the "Test and Store Character in CRT Line Buffer" routine shown in FIGS. 7A and 7B.

DETAILED DESCRIPTION OF THE INVENTION

Figure 1:
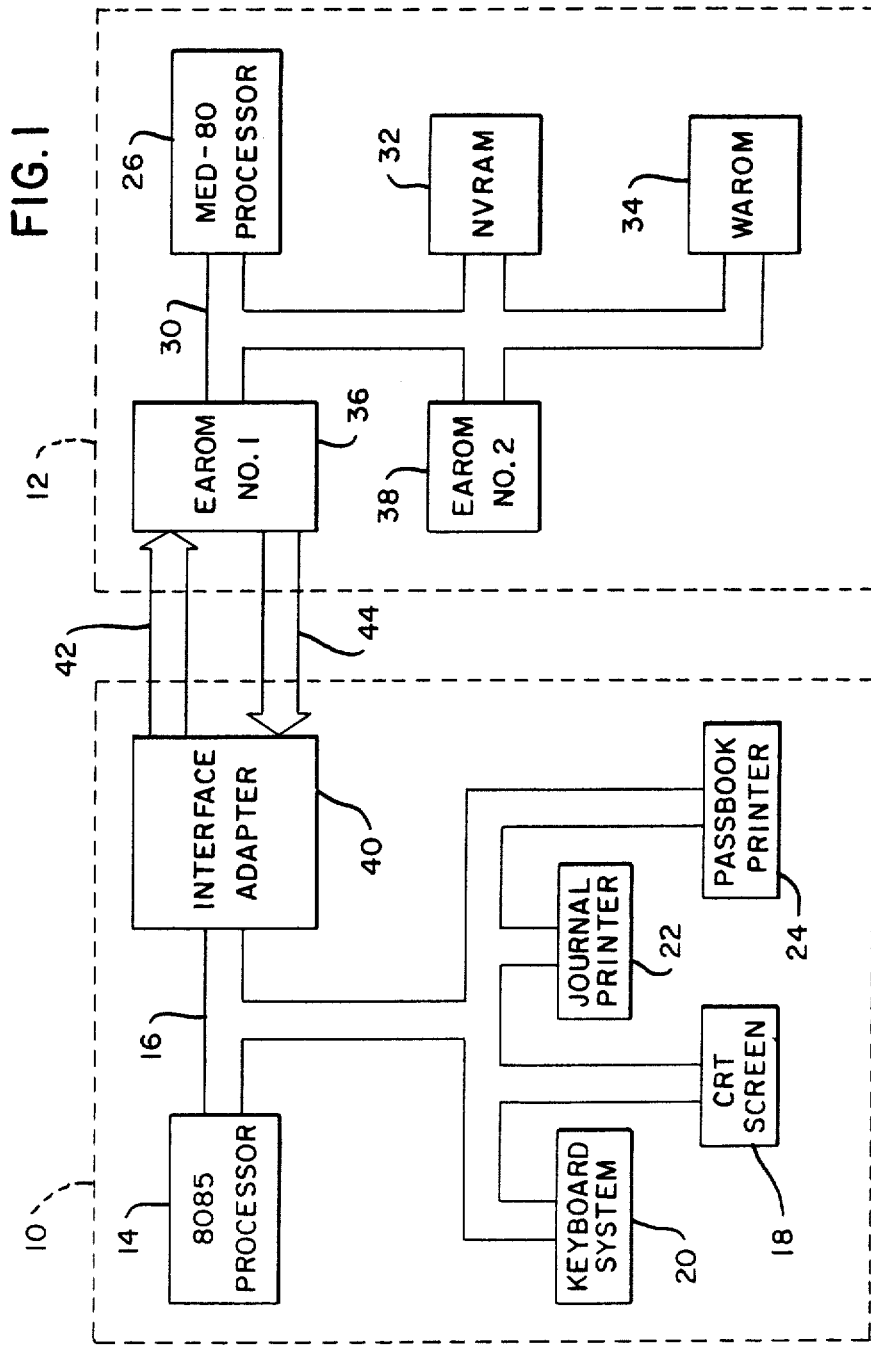
FIG. 1 is a general schematic diagram, in block form, of an apparatus which may be used with this invention.
Figure 3:
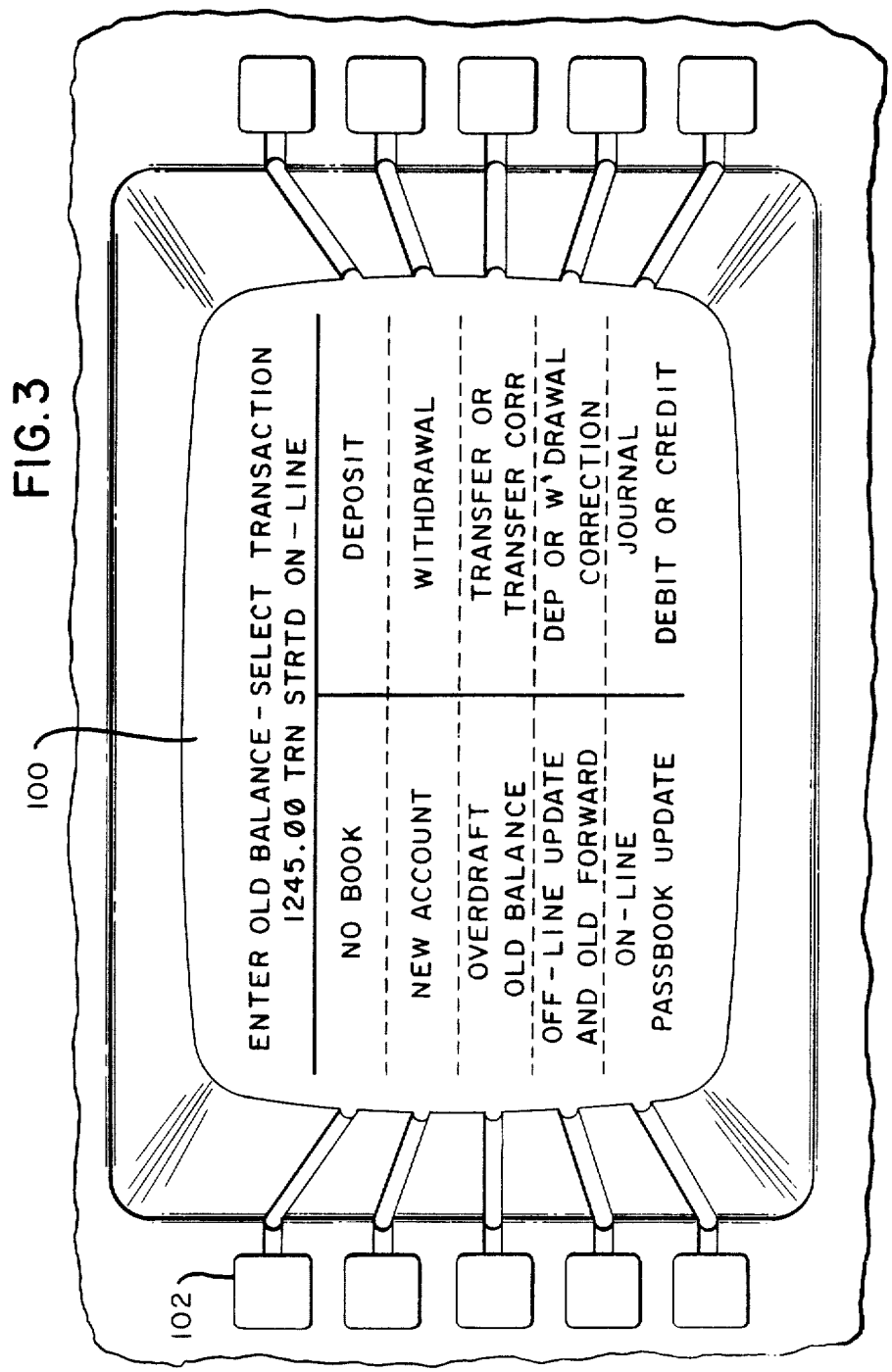
FIG. 3 is a diagram showing the display screen of a cathode ray tube (CRT) with some lead-through messages being displayed on the screen.

FIG. 1 is a general schematic diagram in block form of an automated financial teller terminal in which the present invention may be implemented. There are shown two systems, a main system 10 and a satellite system 12. System 10 contains a microprocessor chip 14, which may be an Intel 8085 chip or any similar device. Microprocessor chip 14 is connected to several peripheral devices via a data bus 16. The peripheral devices include a display device, such as CRT screen 18, which is used for instant data verification and also for displaying various messages, such as the lead-through messages which aid the teller in processing a transaction. Also interfaced with processor chip 14 is a keyboard system 20, consisting of two types of keyboards. One type is a full alphanumeric keyboard for entering descriptive information such as name, address, dollar amounts, and account numbers into the processor to process a transaction. The other type is a Functional Display Keyboard (FDK), arranged into two groups of five keys located on either side of the CRT screen (as shown in FIG. 3), which is used in conjunction with the lead-through messages to aid in processing bank transactions.

Another peripheral device connected with the main processor 10 is a journal printer 22, which produces a detailed record of all transactions and provides tellers with the capability to validate a variety of documents. A passbook printer 24 is also included among the main processor peripherals to update account records in the customer's personal passbooks.

The satellite system 12, also known as the Transaction Parameter (TP) system, is controlled by a microprocessor chip 26, which may be a MED-80 chip manufactured by NCR Corporation, or any other device with similar specifications. Associated with microprocessor chip 26 are several firmware devices via a data bus 30, which devices are responsible for controlling the parameters of the complete system. The memory devices used in the embodiment described are merely illustrative, and are not intended to limit the present invention in any manner; any equivalent devices may be substituted. A non-volatile random access memory (NVRAM) 32, which is an integrated circuit chip manufactured by NCR Corporation, is used to store TP data which is frequently updated, such as teller totals, accumulators, transaction counters, supervisory codes, and terminal sign-in information, since its non-volatility allows the data to remain in case of a malfunction or power failure. NVRAM 32 also used to temporarily buffer each line of CRT frame data during transfer to the main system 10.

Figures 4A, 4B:
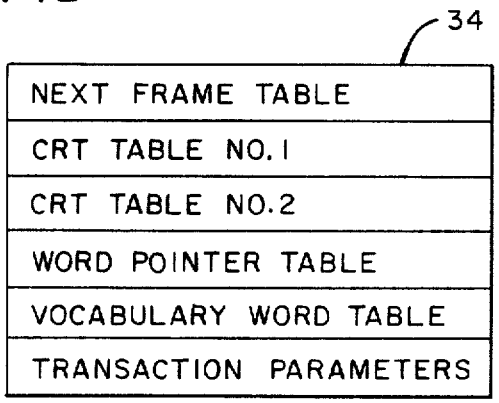
FIG. 4A is a table listing the mask values used for finding the bits in CLT2 associated with a particular WIC located in CLT1.
FIG. 4B is a diagram showing the contents of WAROM 34.

Another component of the system is the word alterable read only memory (WAROM) 34, which is an integrated circuit chip manufactured by NCR Corporation. WAROM 34 stores all the user parameters for the processing system and the CRT frame data for lead-through messages which are adapted to suit each bank's individual specifications. WAROM 34 can be altered under program control, but is intended primarily for the long term storage of data. FIG. 4B is a block diagram of WAROM 34, showing the different tables and parameters contained in this memory.

Another memory unit contained in system 12 is an electrically alterable read only memory (EAROM). In the present embodiment, two 1K × 8 bit integrated circuit chips, which are manufactured by NCR Corporation, EAROM1 36 and EAROM2 38 are used. Each EAROM chip contains 18 input-output (I/O) lines. Chips 36 and 38 contain the firmware associated with the MED-80 processor 26 for performing all functions required of the satellite system 12. This includes the regeneration of the reduced lead-through messages.

The main system 10 is interfaced with the TP system 12 using a programmable interface adapter (PIA) chip 40. The PIA 40 used in the present embodiment is an 8255 integrated circuit chip manufactured by Intel Corporation, having 24 I/O lines which may be individually programmed. The interface between systems 10 and 12 is shown in greater detail in FIG. 2.

Figure 2:
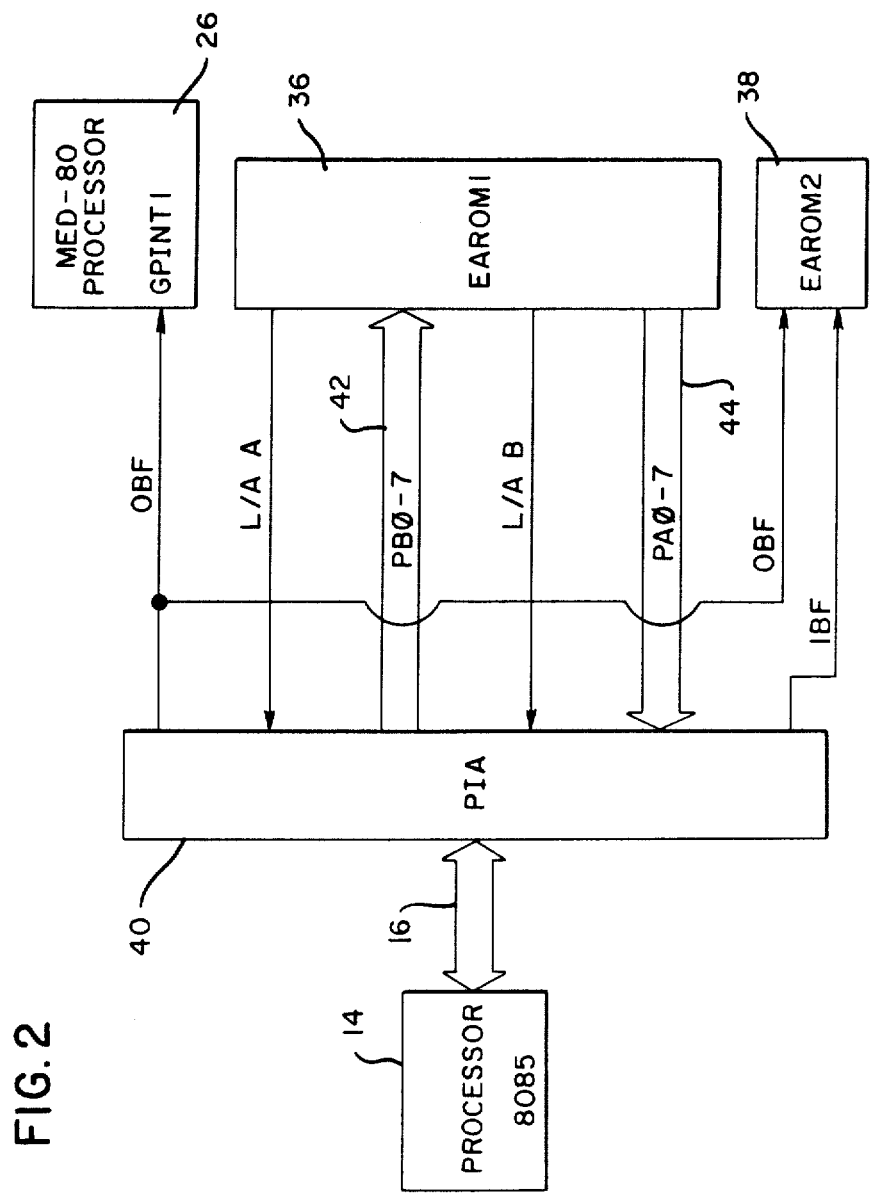
FIG. 2 is a schematic diagram showing the interface between the main system and the satellite system.

Referring now to FIG. 2, the PIA 40 is interfaced to EAROM1 36 via a pair of eight bit data buses 42 and 44. Data bus 42 consists of output lines PB0-7 from PIA 40, which lines are assigned to output a data byte from the 8085 processor 14. Data bus 44 consists of input lines PA0-7 to PIA 40, which lines are assigned to read a data byte from the MED-80 processor 26. Because EAROM1 36 has only 2 extra I/O lines available for handshaking, and transfer in each direction requires 2 lines per direction for handshaking capability, it is necessary that EAROM1 36 and EAROM2 38 operate together to provide complete handshaking between systems 10 and 12.

Due to a physical limitation of EAROMs 36 and 38, it is necessary to hold the MED-80 processor 26 in a halt state while it is waiting for a command. Therefore, it is necessary for the 8085 processor 14 to "wake up" the MED-80 processor 26 to allow communication between the two processors. This is accomplished by applying a signal to the GPINT1 port of the MED-80 processor 26. When the GPINT1 port is active, the MED-80 processor 26 is alerted that data is waiting to be sent to the TP system 12 via bus 42.

When the 8085 processor 14 wishes to send a data byte to the MED-80 processor 26, it must bring the MED-80 processor out of the halt state. It does this by raising the OBF line. Processor 14 can then output the eight bit character on lines PB0-7 of data bus 42 to EAROM1 36. This action causes the signal OBF from PIA 40 to go low, alerting EAROM2 38 that there is data waiting on bus 42. Once the MED-80 processor 26 has been brought out of the halt state, the GPINT1 port is disbled until the entire transfer is completed. Processor 26 can now read the data that was received at EAROM1 36. A signal is then transmitted to PIA 40 by pulsing the L/A B line, acknowledging the receipt of the byte.

When the MED-80 processor 26 wishes to send a data byte to the 8085 processor 14, that byte is placed on lines PA0-7 of data bus 44 between PIA 40 and EAROM1 36. This in turn causes a pulse on the L/A A line, alerting the PIA 40 to the waiting data. The 8085 processor 14 then receives the data on data bus 16 via the PIA 40 and EAROM1 36. A signal IBF is transmitted to EAROM2 38 to acknowledge the receipt of the byte.

Before proceeding with a detailed discussion of the method of storing information used in displaying messages on a CRT screen, it would be appropriate to discuss the general functioning of the financial terminal in which the method of the present invention may be incorporated. In this terminal, the CRT displays instructional message frames that allow the selection of desired operational functions, permit visual verification of entered data, and guide the user step-by-step through each transaction sequence. At the beginning of each transaction, a message frame (home frame) directs the user to enter data and select the proper keys from the Function Display Keyboard (FDK). As the user completes this initial operation, a new frame immediately appears on the CRT screen and instructs the user for continuing the transaction. The sequence of message frames continues under program control and, upon completion of the transaction, the home frame returns to the CRT screen.

An example of a message frame displayed on the CRT screen is shown in FIG. 3. Referring now to FIG. 3, there are shown two groups of five function display keys on either side of the CRT screen 100. Each of the keys 102 is associated with a specific section of CRT screen 100. These ten sections contain the "lead through" messages for assisting the operator in processing the transaction. When the teller wishes to perform the operation which is described in a particular section of CRT screen 100, he depresses the key which is associated with that section. In addition, a section containing two lines capable of containing up to 40 alphanumeric characters is located at the top of CRT screen 100 above the sections. The five sections which are associated with the keys on the left side of CRT screen 100 are each capable of storing two lines of data containing up to 20 alphanumeric characters each; the five sections which are associated with the keys on the right hand side of CRT screen 100 are each capable of storing two lines of data containing up to 19 alphanumeric characters each.

The technique of the present invention reduces each word (including the spaces between adjacent words) which is used in any of the CRT message frames to a single symbol. This technique also reduces the horizontal and vertical relationships between messages contained in separate sections of the CRT screen to a single control symbol. The symbols which perform these operations are called word identification characters, or WICs. A WIC consists of a ten bit binary number, eight bits of which are located in a table stored in memory, and the remaining two bits of which are extracted from a second table. A WIC can fall into two different categories: a control WIC, which is used to regulate the relationship between the different words contained in the message frame to be displayed on the CRT screen; and a data WIC, which is used for word replacement in the message. In the present example, four WICs are reserved for control, and 1020 WICs are available for word replacement.

The uses for the four control WICs are as follows:

New Line (NL, value 001): this WIC indicates that the word associated with the next data WIC should be the first word on the next lower display line;

Vertical Tab (VT, value 002): this control WIC indicates that the word associated with the next data WIC should be the first word on the first line of the next FDK section;

End of Frame (EF, value 003): this control WIC signifies the end of the current display frame;

Unit Separator (US, value 000): this control WIC indicates that the word associated with the data WICs preceding this control WIC should be centered on the display line in the left side FDK section, and the words associated with the data WICs following this control WIC should be centered on the display line in the right side FDK section.

When an NL, EF, or VT control WIC is encountered, the currently buffered CRT line is sent via the PIA interface to the CRT screen to be displayed.

Each CRT frame is defined by a mixture of control WICs and data WICs which are decoded to form one CRT line at a time. This mixture of WICs is stored in two CRT layout tables. These tables, labeled CRT layout table #1 (CLT1) and CRT layout table #2 (CLT2) are stored in WAROM 34 and are each eight bits wide, and each WIC, which is a ten bit number, is separated and stored in the two tables. Each byte in CLT1 contains the low order eight bits of the ten bit WIC, while the other two bits are stored in CLT2. Once the proper CRT frame has been located in CLT1, the upper two bits of each WIC can be located using the following formula. Divide the current CLT1 offset by four and add the result to the start address of CLT2 to find the address of the byte in CLT2 which contains the two extra bits for the desired WIC. Then, using the table shown in FIG. 4A, a bit mask is ANDed with the CLT2 byte to isolate the proper two bits. The remainder after dividing the offset by four is known as Offset MOD 4. Once the full ten bit WIC is known, it can then be identified as either control or data.

To aid in quickly locating the desired frame in CLT1, the MED-80 processor 26 firmware employs the next frame table (NFT), contained in WAROM 34, consisting of 20 pointers which locate every eighth WIC in CLT1. These pointers, which are actually sixteen bit binary words, are used to aid in locating a particular address, since sequentially chaining down through the entire CLT1 file is a very slow process. Each sixteen bit address in the NFT points to every eighth WIC. Therefore, every WIC address which is a multiple of eight (including zero) can be located directly with a pointer. If the WIC address is not a multiple, it is only necessary to chain down seven WICs (at most) to find the desired address. When the main system 10 determines that a new frame should be displayed, it passes the absolute frame number to the TP system 12. This frame number is an eight bit quantity in the range from 0 to 159. The frame number is divided by eight, then multiplied by two and added to the base address of the NFT. This absolute sixteen bit address obtained from the NFT points to a location in CLT1 for the WIC string which defines the next lower frame which is a multiple of eight, from which location the desired frame can be quickly located. This technique was selected to optimize the memory use and execution time trade-off.

If the current WIC is a data WIC, it is used as an offset in the word pointer table (WPT). Each entry in the WPT, which is located in the WAROM 34, is a sixteen bit address that is one of 1020 pointers to the start of a literal string of ASCII characters which represent the English word to be displayed on the CRT screen; these strings of ASCII characters are stored contiguously in another table, called the vocabulary word table (VWT), which is located in WAROM 34. Each string in the VWT represents one English word in the ASCII vocabulary. The use of English words and ASCII codes in the described embodiment are merely illustrative, and are not intended to limit the present invention in any manner; any language or code may be substituted. The string can be of any length, provided it does not exceed the physical limitations of the FDK sections. Thus, each ASCII word needs to be stored only once, and every time that word appears in a CRT frame only the WIC is stored.

Each character in the string of ASCII characters consists of an eight bit byte, with the 7 lowest bits representing an ASCII character, and the high order bit representing an end of word flag. When this high order bit is set, the flag signifies that this byte is the last character in a word.

For every message frame, the TP system 12 interprets each WIC contained in CLT1 until it finds an End of Frame (EF) WIC. Because the main system 10 and the TP system 12 are two independent computers, the technique for lead through message display has been structured to minimize wasted processor capability. This is accomplished by allowing TP system 12 to proceed with the generation of the next CRT line while the main system 10 is busy displaying the current CRT line. Thus, both systems are used simultaneously.

In operation, the actual CRT frame decode routines are stored in EAROMs 36 and 38 within the TP system 12. The main system 10, in effect, sends a command to TP system 12 containing the number of the CRT frame to be displayed. TP system 12 proceeds to locate the proper frame, initializes the necessary pointers and counters, decodes the first line of the CRT frame, and stores the decoded data in a temporary buffer, called the CRT line buffer, located within the TP system memory in NVRAM 32.

When the TP system 12 learns which particular frame is to be decoded, the processor locates the proper frame, decodes the first line, and stores that line in the CRT line buffer. The main system 10 then requests transmission of the stored line, which is done in a manner well known in the art. After the main system 10 receives transmission of the entire CRT line data, the TP system 12 proceeds to decode the next line of CRT frame data. In effect, this allows the main system 10 to begin displaying on CRT screen 100 the first line of data while the TP system 12 is decoding the next line, thus making maximum use of the processing power of the system while also decreasing the response time between the depression of an FDK key 102 and the display of the next frame on CRT screen 100.

Figure 5B:
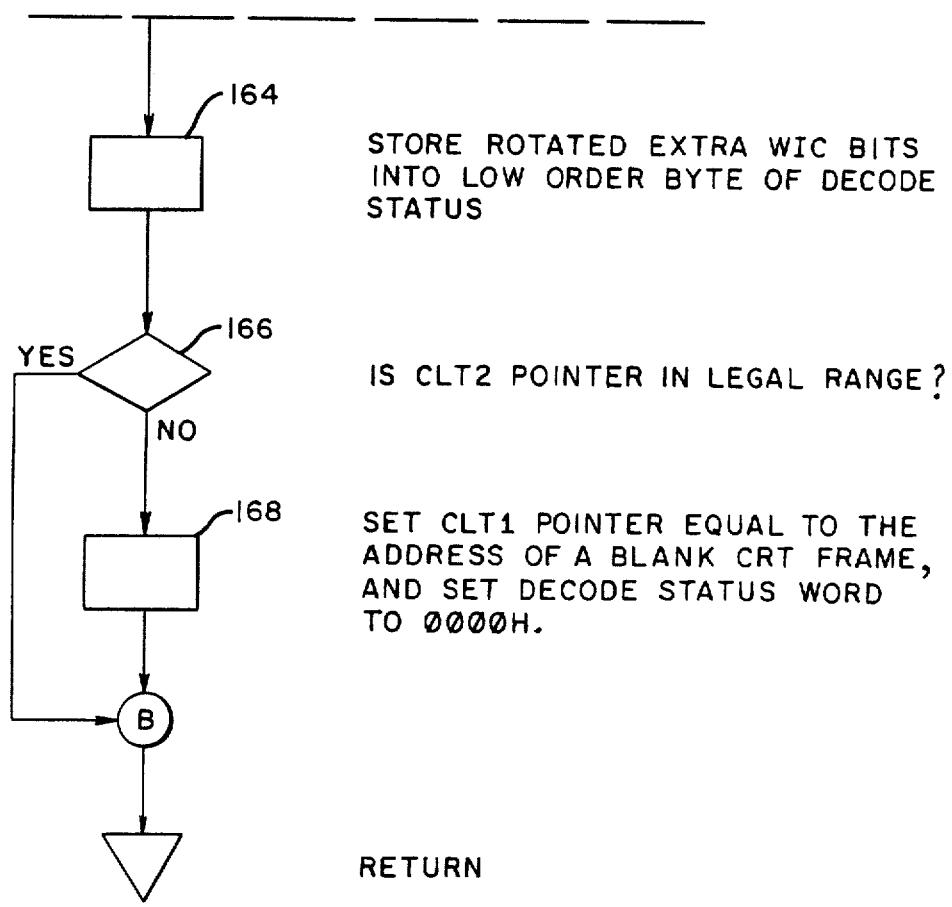
Figure 6B:
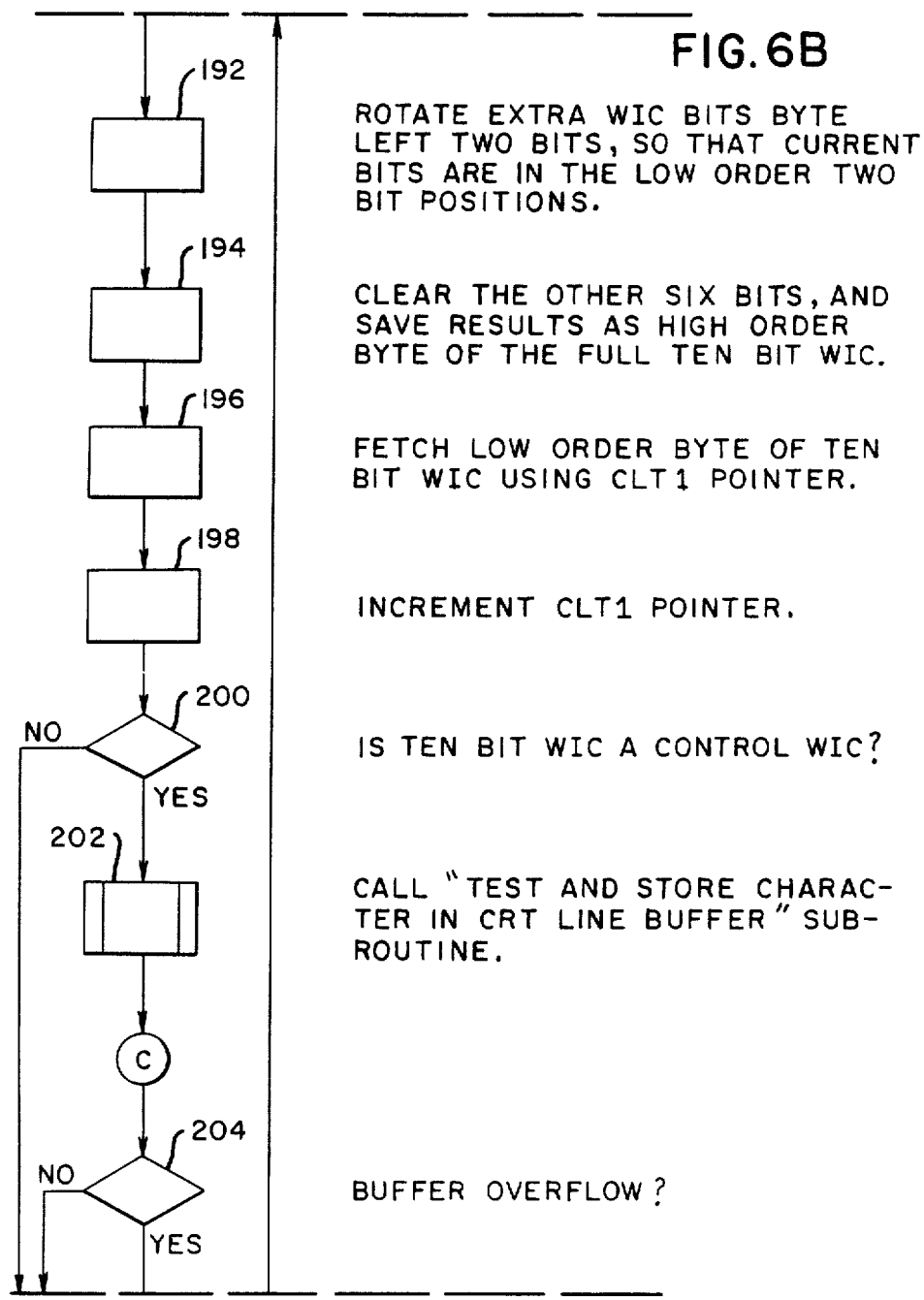
Figure 6E:
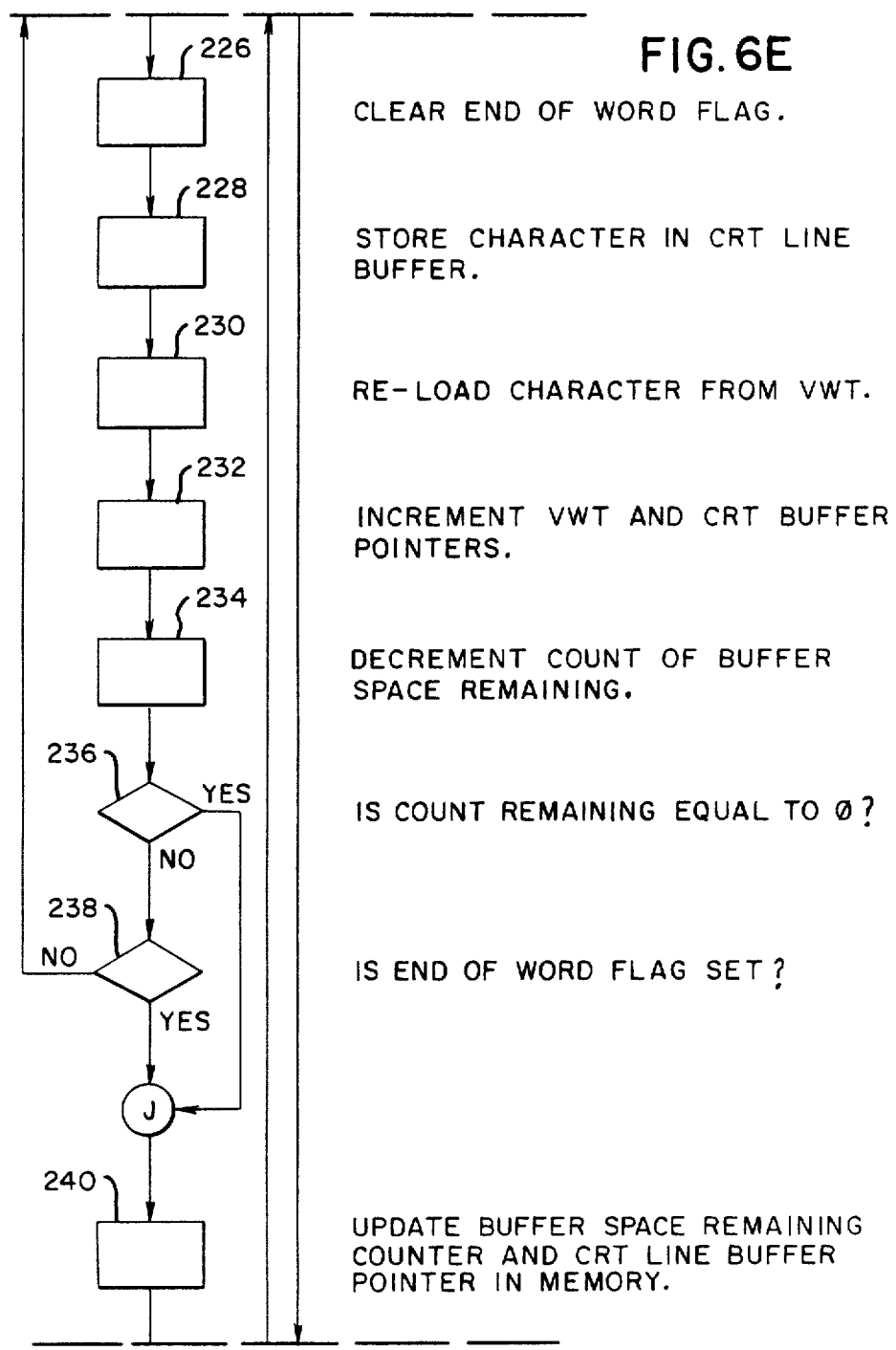
Figure 6F:
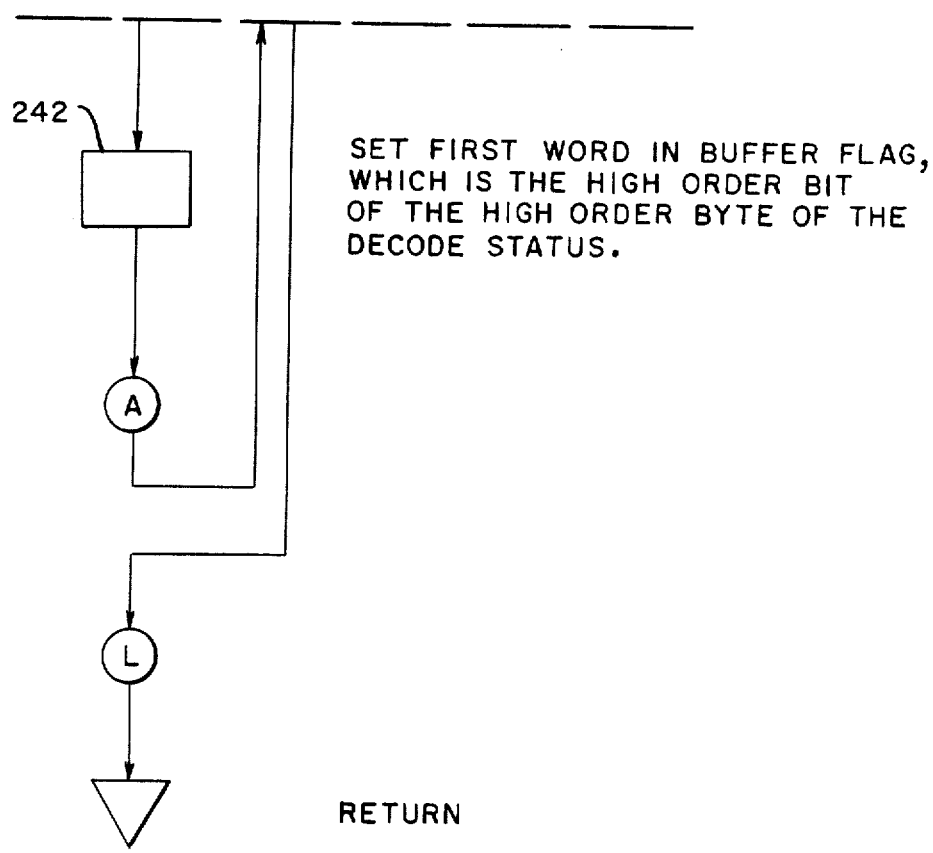

FIGS. 5A and 5B, taken together, represent a flowchart for the various steps included in routine 150 for calculating the pointer to CRT Table No. 2 (CLT2). Step 151 in FIG. 5A indicates the entry into routine 150. In the embodiment being described, the particular processor 26 (FIG. 1) used with routine 150 is a MED-80 microprocessor, although the principles disclosed herein may be extended to other processors. The input parameter necessary in routine 150 is the pointer to the start of the desired frame in the CRT Table No. 1 (CLT1). This parameter is entered into routine 150 at step 151. At step 152 in FIG. 5A, the absolute address of the pointer in CRT Table No. 1 is changed to a relative address.

At step 154, the high order byte of the decode status is set to the CLT1 offset MOD4. The decode status is a two byte quantity which is stored in a general purpose register pair with the low order byte containing the byte from CLT2 which contains the extra WIC bits, and the high order byte used as a counter to indicate how many of the extra bits stored in the low order byte have not yet been used. Offset MOD4 is necessary because each byte in CLT2 contains four sets of 2 bit WICs since for each byte in CLT1 there are two corresponding bits located in CLT2. By dividing the offset in CLT1 by four, which is performed in step 156, the address of the appropriate byte in CLT2 is obtained, and this pointer is stored in memory for later use. At step 158, the CLT2 pointer is used to select one of the four two bit quantities that are contained in the byte in CLT2.

At step 160, in FIG. 5A, the question "Is the CLT1 offset MOD4 equal to zero?" is examined. If the answer is "No", the extra WIC bits byte, which contains the four sets of two bits, is rotated x bits to the left at step 162, where x equals 2 times CLT1 offset MOD4, the effect of which is to put the active extra WIC bits in the high order (leftmost) two bit positions, so that the current byte in CLT1 corresponds to these high order two bit positions in the extra WIC bits byte. This current extra WIC bits byte in CLT2 will eventually be rotated until all the bits are used.

If the answer to the question asked at step 160 is "Yes", then routine 150 jumps to step A, bypassing step 162.

From step A (FIG. 5A) routine 150 proceeds to step 164 (FIG. 5B), in which step the extra WIC bits byte originally obtained at step 158 (FIG. 5A) is stored in the lower order byte of the decode status.

At step 166, the question "Is the CLT2 pointer in the legal range?" is examined. This question determines whether the WAROM used to store the frames has been programmed or has malfunctioned, or contains information which is meaningless. If the answer is "No", the CLT1 pointer is set equal to the address of a blank CRT frame at step 168, and the decode status word is set to 0000H. This step will cut the decode time and return the blank frame immediately, indicating to the main program that there is no valid frame data, and that it should default to some other method. If the answer to the question posed at step 166 is "Yes", then step 168 is bypassed, and the routine 150 proceeds to step B, which step causes the processor to return to the main program.

FIGS. 6A-F, taken together, represent a flowchart for the various steps included in routine 180 for decoding a CRT line. Step 181 (FIG. 6A) indicates the entry into routine 180. The input parameters necessary in routine 180 are the current pointers into Tables CLT1 and CLT2, the decode status bytes, which contain the extra WIC bits counter in the high order byte and the extra WIC bits themselves in the low order byte. These parameters are called in from memory (EAROMs 36 and 38); no actual register parameters are passed. At step 182, certain variables and buffers are initialized, such as the positions available counter for the 42 character CRT line buffer (which buffer is used to store the decoded CRT line for transfer to the main processor) in NVRAM 32, the unit separator seen flag, and the pointer to the next available position in the CRT line buffer (which indicates where the next character can be stored in the buffer). To minimize the execution time of routine 180, all the pointers that are frequently used are kept in registers, specifically CLT1 pointer, CLT2 pointer, and decode status bytes; leaving only the accumulator to be used for calculations. When initialization has been accomplished, the routine 180 proceeds to step A.

At step 184, the high order byte of the decode status, containing the CLT1 offset MOD4 which was previously stored in this byte, is incremented. Then, at step 186, the question "Is the value of this byte equal to 5?" is asked. If the answer to this question is "Yes", then all four of the two bit extra WICs that were stored in this byte have been used. It is then necessary to clear the four bit overflow, which clearing occurs at step 188, leaving a count of 1 in the high order byte. The high order bit in this high order byte of the decode status is also used as a flag, indicating that the first ASCII word has not yet been placed in the buffer. When this bit is set, it is necessary to precede a new word with a space so that there is a space between consecutive ASCII words.

At step 190, the CLT2 pointer is incremented, and a new extra WIC bits byte is fetched and stored in the low order byte of the decode status, replacing the contents of that register. Routine 180 then proceeds to step B. If the answer to the question asked at step 186 is "No", steps 188 and 190 are bypassed and the program proceeds directly to step B.

At step 192 (FIG. 6B), the extra WIC bits byte is rotated to the left two bits, so that the current bits are in the rightmost (low order) two bit positions. This value remains temporarily in the accumulator of the MED-80 processor 26 so that the original value is not yet destroyed. At step 194, the other six bits of this extra WIC bits byte are cleared, leaving only the current two bits in the lowest two bit positions. This quantity is saved in one of the registers as the high order byte of the full ten bit WIC. At step 196, the low order byte is fetched using the pointer to CLT1 and saved as the low order byte in that same register, forming the full ten bit WIC, and the CLT1 pointer is then incremented at step 198.

At step 200, the question, "Is this ten bit WIC a control WIC?" is examined. If the answer to the question posed at step 200 is "yes", the subroutine "Test and Store Character in CRT Line Buffer" 202, which stores the control WIC, increments the CRT line pointer, and decrements the positions remaining counter, is called at this point. If the question asked at step 200 is answered negatively, then routine 180 jumps ahead to step G. When routine 180 returns from the subroutine 202, it returns at step C, and the question "Is the buffer overflow flag set?" is asked at step 204. If the answer to the question posed at step 204 is "Yes", and end of frame control WIC (EF) is placed in the last position of the CRT line buffer at step 206 (FIG. 6C), and then exits the loop at step L, returning to the main routine in the MED-80 processor 26. This will shorten the frame decode time if the memory contains invalid data.

If the answer to the question at step 204 is "No", the program proceeds to step D, and, continuing to step 208, the first word in buffer flag is cleared, indicating that the word is not to be preceded by a space. At step 210, the question "Is the control WIC a unit separator?" is asked. If the answer to the question at step 210 is "No", routine 180 proceeds to step 214, where the CLT1 pointer, the CLT2 pointer, and the decode status are stored in memory (EAROMs 36 and 38), and then routine 180 exits the loop at step L and returns to the main program. If the answer to the question at step 210 is "Yes", the unit separator seen flag is set. This unit separator flag is translated across the interface to the main system 10 with the CRT buffer itself. The value of the unit separator is the actual number of characters, including the unit separator itself, in the count so that it can assist the main system 10 in centering the two halves of the frame in the respective halves. When this is completed, routine 180 returns to step A at the beginning of the loop to decode the right half of the frame.

At step G, which step is reached when the question at step 200 (FIG. 6B) is answered in the negative, routine 180 assumes that the ten bit WIC is a data WIC. This ten bit WIC is now multiplied by two at step 216 (FIG. 6D) to form an offset into the Word Pointer Table (WPT). This offset is added at step 218 to the actual start address of the WPT to form an absolute address, which address is used to fetch the pointer, which points to an address within the WPT. In effect, this pointer points to the first letter of the ASCII word which is to be stored in the CRT line buffer in NVRAM 32. At this point, the Test and Store Character in CRT Line Buffer subroutine 202 is called. Subroutine 202 will examine the bit in the decode status which indicates whether or not the first word or first data WIC has been decoded. If the bit is set, a space will be stored; if not, no space is stored, even though it was given the space to store. Subroutine 202 checks this bit before it actually stores anything.

If the question at step 220 is answered "Yes", then an end of frame WIC (EF) is forced into the buffer at step 222, shortening the frame decode time if the WAROM has not been programmed properly or something has malfunctioned. The program then exits the routine at step L and returns to the main routine in the MED-80 processor 26.

If the CRT line buffer is not full, then routine 180 proceeds to step H, which is the beginning of a loop which transfers the ASCII word from the Vocabulary Word Table (VWT) to the CRT line buffer. The character is loaded from the VWT at step 224, and, in addition, the end of word flag is cleared at step 226 (FIG. 6E) to guarantee that it is not transferred. The end of word flag is the high order bit of an eight bit ASCII character; it is set to indicate the end of a string of ASCII characters. The character is now stored in the CRT line buffer at step 228. The character is then reloaded at step 230, since the end of word flag will be further examined later. The VWT and CRT buffer pointers are incremented at step 232 in preparation for the next character. Also, the count of the buffer space remaining in the CRT buffer is decremented at step 234.

At step 236, the question "Is the count of buffer space remaining equal to zero?" is asked. If the answer to this question is "Yes", routine 180 proceeds to step J. If the answer is "No", it is then necessary to determine, at step 238, whether the end of word flag is set. If the end of word flag is not set, routine 180 loops back to step H (FIG. 6D) to repeat steps 224, 226, 228, 230, 232, 234 and 236 for the next character. If the end of word flag is set, routine 180 then proceeds to step J, which is the same step reached if the buffer space count has reached zero. At step 240, the buffer space remaining counter which is stored in memory based on the number of characters that are actually stored, is updated, and the CRT line buffer pointer is updated for the next word to be stored. At step 242 (FIG. 6F), the first word in buffer flag, which is the high order bit of the high order byte of the decode status, is set so that the next time the word is stored it will be preceded by a space when displayed on the CRT screen. Routine 180 then returns to step A (FIG. 6A), where a new byte is fetched from CLT1 and a new WIC is generated, and the entire procedure repeats.

FIGS. 7A and 7B, taken together, represent a flowchart for the various steps included in subroutine 202 used to test and store characters in the CRT line buffer in NVRAM 32. Step 250 in FIG. 7A indicates the entry into subroutine 202. The input parameters used in subroutine 202 are: the character to be stored, and the high order byte of the decode status, which contains the first word in the buffer flag. The output parameters are: the pointer to the address of the next available buffer position, the number of remaining positions in the buffer, the character itself that was stored, the buffer full flag, and the character stored flag.

At step 252, the bytes remaining count and CRT line buffer pointer are loaded from memory (EAROMs 36 and 38). The question "Is the positions remaining count equal to 0?" is then asked at step 254. If the answer is "Yes", the buffer full flag is then set at step 256, and subroutine 202 proceeds to step B (FIG. 7B). If the answer to the question posed at step 254 is "No", subroutine 202 proceeds to step A (FIG. 7A), then the buffer full flag is cleared at step 258, and subroutine 202 proceeds to step B (FIG. 7B). Next, the character stored flag is set equal to the first word in buffer flag at step 260. At step 262, the question "Is the first word in buffer flag set?" is examined. If the first word in buffer flag is set, then the character stored flag must be cleared at step 264. If the first word in buffer flag is not set, then subroutine 202 advances to step C and returns to the main routine. At step 266, the question "Is the buffer full flag clear?" is asked. If if is clear, the buffer is not full, and the character can be stored. At step 268, the character is stored, the buffer pointer is incremented and the positions remaining counter is decremented. The character stored flag is also set at this step, since a character has been stored. If the answer to the question asked at step 266 is "No", then subroutine 202 advances to step C and returns to the main routine.

The question "Is the positions remaining count equal to 0?" is asked at step 269. If the answer is yes, the buffer full flag is set at step 270, and the processor returns to the main program at step C. If the positions remaining count is not equal to zero when the character stored flag has been set, then the buffer full flag is cleared at step 272, indicating the buffer is not yet full, and then the program will exit the loop at step C.

FIGS. 8A–8C comprise a detail program listing for routine 150 shown in FIGS. 5A and 5B. FIGS. 9A–9E comprise a detail program listing for routine 180 shown in FIGS. 6A –6F. FIGS. 10A and 10B comprise a detail program listing for subroutine 202 shown in FIGS. 7A and 7B. The actual machine codes and instructions shown in FIGS. 8A–8C, FIGS. 9A–9E, and FIGS. 10A–10B relate to both the Intel 8085 processor and the NCR MED-80 processor in the embodiment described; however, the techniques employed herein may be extended to other processors. Definitions of the various machine codes and instructions may be obtained from, for example, a publication entitled "MCS-85 Users Manual", which was published by Intel in 1978.

While the invention has been described in detail and with reference to specific embodiments thereof, it will be understood by those skilled in the art that various changes and modifications can be made therein without departing from the spirit and scope of the invention. Therefore, it is to be understood that the present invention is not to be limited beyond that as required by the appended claims.

I claim:

1. An apparatus for displaying messages on a display device in which each message is a display comprised of a plurality of individual message words in at least one line, comprising:

a first addressable message word memory for individually storing each of said message words contained in said messages, with each word comprising a plurality of binary-coded characters;

a second addressable word pointer memory for storing the address of the first binary-coded character in each of said message words stored in said first memory;

a third addressable memory for storing a plurality of data code representations, each of which points to an address in said second memory which in turn provides an address for said message words which define a particular message to be displayed, and also for storing a plurality of control code representations which define the relative positioning of said message words with respect to each other on said display device;

a buffer for storing assembled message words for subsequent display on said display device;

data bus means operatively coupling said first, second and third memory means and said buffer;

and data processor means coupled by said data bus means to said first, second and third memory and to said buffer for addressing said third addressable memory to obtain said data and control code representations and to use said data code representation to address said second memory to obtain further addresses, to use said further addresses to retrieve the message words from said first memory, and to use said control code representation to position in said buffer the retrieved message words to display a particular message.

2. A data processor implemented method for displaying a message on a display device, each message including at least one line of information, in which each line is comprised of a plurality of individual message words, comprising the steps of:

(a) addressing by data processor a first memory to locate data code representations, each of which represents a message word to be displayed and to locate control code representations which define the relative positioning of said message words in a line, including an end of line code;

(b) utilizing said data code representations to address a second memory;

(c) retrieving from said second memory at said address a pointer for locating said message words in a third memory;

(d) transmitting said message words from said third memory to a buffer for subsequent display on said display device; and (e) repeating steps (a), (b), (c), and (d) under control of the data processor until all the message words for a particular line of information have been located and stored in said buffer, and a control code representation indicating the end of a line has been located to end the line.

3. A data processor implemented method for displaying a message on a display device, where each message is comprised of a plurality of individual message words in at least one line, comprising the steps of:

(a) addressing by data processor a first memory to locate data code representations, each of which represents a message word to be displayed and to locate control code representations which represent control functions;

(b) utilizing said data code representations to address a second memory;

(c) retrieving a pointer from said second memory at said address, which pointer locates a message word in a third memory;

(d) transmitting said message words from said third memory to a buffer for subsequent display on said display device; and (e) repeating steps (c) and (d) for each message word generated by the data processor from a data code representation until one of said control code representations indicating the end of a line or the end of a message is encountered in said third memory;

(f) transmitting the contents of said buffer representing one line of a message to a display device;

(g) and repeating steps (a) through (f) until all of the lines of a particular message have been displayed on said display device.

4. An apparatus for displaying a message comprising a plurality of individual message words on a display device, comprising:

display means;

first data processing means for causing the display of message words in a predetermined locational relationship on said display means;

buffer means for temporarily storing information to be transmitted to said display means under control of said first data processing means;

first memory means for storing a plurality of individual message words which comprise said information to be displayed on said display means;

second memory means for storing message word addresses and control code representations for assembling the message words from said first memory means into messages;

data bus means operatively coupling said display means, said first data processing means, said buffer means and said first and second memory means;

and second data processing means operatively coupled by said data bus means to said buffer means for controlling the exchange of message words and control code representations to said buffer means from said first and second memory means, for controlling the addressing of said first and second memory means and for controlling the transmission of message words to said first data processing means through said buffer means for the display of messages on said display means.

* * * * *